Patented Oct. 26, 1937

2,096,722

UNITED STATES PATENT OFFICE 2,096,722

ARYL MERCURY CARBOXYLATES OF DYES

Carl N. Andersen, Watertown, Mass., assignor to Lever Brothers Company, a corporation of Maine No Drawing. Application January 21, 1935, Serial No. 2,760

9 Claims. (Cl. 260—13)

The present invention relates to the production of certain new organic mercury compounds, and more particularly to aromatic mercury derivatives of dyes containing a carboxyl group.

It is an object of my invention to produce new organic mercury compounds useful as germicides and for other therapeutic purposes.

More particularly, it is an object of my invention to prepare certain organic mercury compounds which may be regarded as derivatives of dyes.

I have discovered that when certain hydrogen atoms in a dye are replaced by the essential radical of certain aromatic mercury compounds, compounds are produced which have extraordinarily high potency as antiseptics and germicides and at the same time are characterized by relatively low toxicity and other desirable properties.

The compounds constituting the subject-matter of my invention may be described as having the general formula $(RHg)_x.R_1$, in which R represents an aromatic structure, to a carbon of which the mercury is directly attached; in which $x$ is an integer representing the number of aromatic mercury groups in the compound, which integer is at least one and not more than the number of replaceable hydrogen atoms in the radical $R_1$; and in which $R_1$ represents a radical of a dye, which radical is linked to the RHg group or groups through the replacement of one or more hydrogen atoms in the dye. While the words "group" or "groups" are used hereinafter, it is obvious that these words are to be understood as singular or plural depending upon the value of $x$.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

More particularly, $R_1$ represents a radical of a dye which contains the COOH group.

The dyes from which aromatic mercury derivatives may be prepared are of various chemical structures, colors and dyeing properties. I have investigated dyes of many chemical structures, such as the azo (mono and poly) type, xanthine type, pyrazolone type, azine type, anthraquinone type, thiazole type, stilben type, quinoline type, oxazine type, triphenyl methane type, anthraquinoid type, etc., all of which I find may be used to produce aromatic mercury derivatives possessing germicidal properties. By the term "dye" I refer to a chemical compound containing one or more of the "chromophore" groups, and therefore to a compound possessing a characteristic color.

The chemical structure of dyes is very complex and the exact chemical mechanism of the reactions into which they enter is very difficult to determine. In the following paragraphs I have outlined some general principles which should assist in determining the formulae of my novel compounds. However, having disclosed the method by which my new compounds may be produced so as to enable a person skilled in the art to practice my invention, I do not feel obliged to assign a definite chemical formula to every compound within the scope of my invention.

Many dyes possess certain groups which contain a replaceable hydrogen atom. For example, the sulphonic group —$SO_3H$, the carboxyl group —COOH, the hydroxyl group —OH, the sulfonamido group —$SO_2NH_2$, and the —NH group. From my investigations I am inclined to believe that when a dye contains one or more of any of these groups it is the hydrogen atom or atoms thereof that are replaced by the aromatic mercury radical.

In cases in which more than one of the different groups occur in one dye, it is difficult to tell in which group the hydrogen has been replaced by the aromatic mercury radical. Certain general rules should apply. There are exceptions to these rules due to the effect of steric hindrance, and the effect of other groups in the molecule. However, it is a convenient guide to classification.

The sulfonic acid group is the most acidic and when present in a dye it will usually be the group to react with the aromatic mercury compound. When the dye does not contain a sulfonic group, the carboxyl group is the next most acidic and will be the group to react. If a dye contains neither the sulfonic nor the carboxyl groups, the phenolic hydroxyl is the most reactive. The alcoholic hydroxyl is slightly less reactive than the phenolic. The NH group is usually the least reactive and only reacts when all of the other above mentioned more active groups are absent or do not exist in the free state. The rule regarding the dyes containing the NH group holds true with less regularity, however, as I find some instances where the NH group is quite reactive. This is particularly true of dyes in which the reactivity of the NH group varies greatly with the surrounding groups. The difference in reactivity between the hydroxyl and NH groups is not as pronounced as is the case with the other groups, for example, the carboxyl and the hydroxyl.

When it is desired to replace a particular hydrogen atom by the aromatic mercury radical, it is often necessary to block the substitution in the more reactive groups. For example, when a dye contains both the carboxyl and the sulfonic groups and both are free acids, the aromatic mercury radical will react with the sulfonic group as explained above. If sufficient alkali is added to convert the sulfonic group to an alkali sulfonate leaving the carboxyl group free, then the aromatic mercury radical will react with the carboxyl group. Similarly, when only the carboxyl and hydroxyl groups are free, the aromatic mercury radical reacts with the carboxyl group. If the carboxyl group is converted into a salt, the aromatic mercury radical will react with the hydroxyl group. The same system of blocking may be employed in the case of dyes containing other combinations of the above mentioned radicals.

In many cases the dyes are sold as salts, in which case the hydrogen of one or more groups has been replaced by an alkali metal. When the dye-stuff is available only in this form, and it is desired to introduce the aromatic mercury radical into one of these groups, the free acid should be liberated by treatment with a mineral acid before being reacted with the aromatic mercury compound.

If the dye is not so treated the substitution will no doubt take place in the most reactive group containing a free hydrogen. For example, if a dye contains the SO₃Na, COONa, OH and NH groups, the substitution will be in either the OH or NH groups, depending upon which is the more reactive in that particular compound.

This permits more than one aromatic mercury compound to be prepared from a single dye. For example, if a dye contains the SO₃Na, COONa, and the OH groups, it would be possible to form three compounds, depending on the position in the dye molecule at which the aromatic mercury radical is introduced.

The hydrogen atom of more than one of similar or different groups may be replaced if desired. For example, if the dye contains two COOH groups or a COOH group and an OH group, the hydrogen of both groups may be replaced if a sufficient quantity of the aromatic mercury compound is employed in the process.

From the above explanation it will be apparent that when a dye containing the COOH group either naturally or by treatment of an alkali carboxylate with an acid, the aromatic mercury radical will be attached to this group even though the dye contains one or more of the following groups: SO₃Na, ONa, OH and NH. The dye, however, may not contain the SO₃H group.

The following examples will illustrate the types of dyes which I may employ in producing the novel aromatic mercury compounds constituting the present invention:

Fastusol Yellow GGA (azo type), "Schultz", 7th ed., #341, "Colour Index" #346.

Chrysamine L (azo type), "Schultz" #419, "Colour Index" #410.

Alizarine Yelllow (azo type), "Schultz" #66, "Colour Index" #40.

Diamine Yellow N (azo type), "Schultz" #525, "Colour Index" #488.

Eosine Y (xanthine type), "Schultz" #881, "Colour Index" #768.

Phloxine RB (xanthine type), "Schultz" #888, "Colour Index" #774.

Uranine SS (xanthine type), "Schultz" #880, "Colour Index" #776.

Gallocyanine (oxazine type), "Schultz" #998, "Colour Index" #883.

Rhodamine B (xanthine type), "Schultz" #864, "Colour Index" #749.

The Fastusol Yellow GGA, listed above, has the following formula:

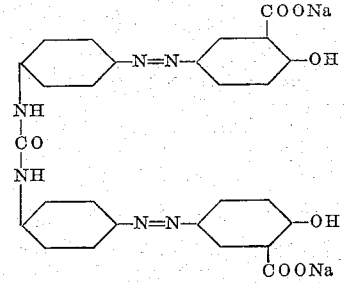

The dyes above noted are examples of dyes containing the COOH group or salt corresponding thereto. They may contain one or more of the SO₃Na, OH, ONa, or NH groups. Dyes which contain the COOH group in combination with the SO₃H group are not listed here inasmuch as they constitute a part of the subject-matter of my application Serial No. 2,759, filed January 21, 1935.

The general method of preparing my novel compounds consists in reacting the dye with an aromatic mercury compound of the above mentioned RHg type. Any common solvent in which the reacting components are soluble may be used. The compound resulting from the reaction is often relatively insoluble as compared with the reacting components and upon its precipitation may be filtered, washed and dried. If the compound formed is too soluble to precipitate, the solution may be concentrated and the new compound will crystallize out. For reasons of convenience, one of the more soluble aromatic mercury compounds is selected as a reacting material, such as the hydroxide, or a soluble salt, for example, the acetate or the lactate. The hydroxide has the advantage that in most instances water is the only other compound formed, if any, and the resultant product may be more easily purified.

The following examples are given as illustrative of the method by which all of the dye compounds of the present invention may be prepared and the products prepared are illustrative of representative aromatic mercury dye derivatives falling within the scope of my invention:

*Example 1*

20.16 grams of phenylmercury acetate is dissolved in 2 liters of water and heated until solution is complete. The solution is then filtered to remove any insoluble material. To the filtrate is added 24.6 grams of Rhodamine B (Schultz #864, Colour Index #749), dissolved in 400 cc. of water. A precipitate results immediately. The mixture is heated for a few minutes, after which it is allowed to stand and cool. The precipitate is separated by filtration, washed well with warm water and dried.

This dye contains a free carboxyl group, the hydrogen of which is believed to be replaced by the phenylmercury radical Rhodamine B has the following formula:

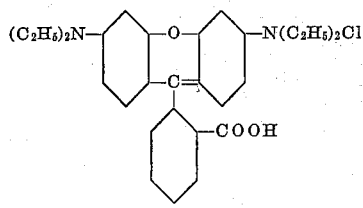

Example 2

17.64 grams of phenylmercury hydroxide is dissolved in 2 liters of water and heated until solution is complete. The solution is filtered to remove any insoluble material. To the filtrate is added 200 cc. of hot water containing 18.54 grams of Alizarine Yellow ("Schultz" #66, "Colour Index" #40), and the mixture heated for a few minutes, during which time reddish brown crystals separate. The mixture is allowed to stand and cool, after which it is filtered and the precipitate washed well and dried.

This dye contains one carboxyl group and one hydroxyl group. When the carboxyl group is free the carboxyl hydrogen atom will, it is believed, be replaced by the phenylmercury radical. This dye may also be obtained with the carboxyl group substituted. In that case the dye must be treated preliminarily with an acid if the substitution is to be made in the carboxyl group.

Alizarine Yellow has the following formula:

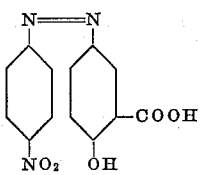

Example 3

35.28 grams of phenylmercury hydroxide is dissolved in 2 liters of water and heated until solution is complete. The solution is filtered to remove any insoluble material. A solution of 500 cc. of alcohol containing 47.52 grams of Phloxine RB (Schultz #888, Colour Index #774), is prepared and to it is added sufficient concentrated sulphuric acid to convert the alkali substituted group, or groups, into the free acid. The filtrate of the phenylmercury hydroxide solution is then added to the dye solution and the mixture heated to evaporate off the alcohol and insure completion of the reaction. On cooling a violet precipitate separates. The mixture is allowed to stand, after which it is filtered and the precipitate washed well with warm water and dried.

This dye contains an alkali metal carboxylate group and the alkali metal alcoholate group. The sulphuric acid liberates the free carboxylic acid group, the hydrogen of which is believed to be replaced by the phenylmercury radical.

In each of the above examples the reacting materials are employed in substantially theoretical quantities. In certain instances, if desired, an excess, say 10%, of the dye may be employed in order to assure the complete conversion of the aromatic mercury compound.

From the description of these specific examples it will be readily apparent to one skilled in the art how other dyes of the type above described may be reacted with an aromatic mercury compound to produce aromatic mercury dye derivatives.

The operativeness of the process is not found to depend in any degree upon the temperature at which the reaction is effected. It is convenient to use heat because it facilitates the solution of the reacting components and in some cases speeds the reaction, but the process can be carried out at any temperature, for example, room temperature. The process may be carried out in any solvent in which both reacting components are soluble. Water is usually employed for reasons of convenience, but any other material which does not enter into the reaction and in which the materials are soluble, may be used, for example, one of the alcohols, acetone, or mixtures of these with each other or with water.

All of the compounds produced as above described are characterized by extraordinarily high potency as germicides. Tests to determine the efficacy of certain of them in killing *B. typhosus* and *Staph. aureus* were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. Special Method against *Staph. aureus* at 37° C.

As illustrative of the potency of the compounds, the killing power of the following compounds is given merely as illustrative:

The figures represent the maximum dilutions at which killing in 15 minutes resulted:

| | B. typhosus | Staph. aureus |
|---|---|---|
| Phenylmercury derivative of Phloxine RB | 1: 90,000 | 1: 20,000 |
| Phenylmercury derivative of Rhodamine B | 1: 60,000 | 1: 30,000 |

In addition to their high germicidal value, all of these compounds are characterized by relatively low toxicity. Because of these properties it is possible to use them in extreme dilutions and in many situations where known germicides, because of toxic or other undesired properties, can not be employed. They may be used externally and locally with satisfactory results from the germicidal standpoint and without harmful effect to the body or its functions.

The compounds retain their germicidal activity when incorporated in soap and various menstrums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new organic mercury compound of the general formula $(RHg)_x.R_1$, in which R represents an aromatic structure, to a carbon atom of which the mercury is directly attached, and in which none of the carbon atoms has direct linkage with any element other than hydrogen, carbon and mercury; in which $R_1$ represents a radical of a dye containing a carboxyl group, which radical is linked to an RHg group by the replacement of a carboxyl hydrogen atom; and in which $x$ is an integer representing the number of RHg groups in the compound, which integer is at least one and not more than the number of carboxyl hydrogen atoms in the radical $R_1$.

2. A new organic mercury compound of the general formula $(RHg)_x.R_1$, in which R represents an aromatic structure, to a carbon atom of which the mercury is directly attached, and in which none of the carbon atoms has direct linkage with any element other than hydrogen, carbon and mercury; in which $R_1$ represents a radical of a dye containing carboxyl, hydroxyl and NH groups, which radical is linked to an RHg group by the replacement of a carboxyl hydrogen atom; and in which $x$ is an integer representing the number of RHg groups in the compound, which integer is at least one and not more than the number of carboxyl hydrogen atoms in the radical $R_1$.

3. A new organic mercury compound of the general formula $(RHg)_x.R_1$, in which R represents an aromatic structure, to a carbon atom of which the mercury is directly attached, and in which none of the carbon atoms has direct linkage with any element other than hydrogen, carbon and mercury; in which $R_1$ represents a radical of a dye containing carboxyl and hydroxyl groups, which radical is linked to an RHg group by the replacement of a carboxyl hydrogen atom; and in which $x$ is an integer representing the number of RHg groups in the compound, which integer is at least one and not more than the number of carboxyl hydrogen atoms in the radical $R_1$.

4. A new organic mercury compound of the general formula $(C_6H_5Hg)_x.R_1$, in which $R_1$ represents a radical of a dye containing a carboxyl group, which radical is linked to a $C_6H_5Hg$ group by the replacement of a carboxyl hydrogen atom; and in which $x$ is an integer representing the number of $C_6H_5Hg$ groups in the compound, which integer is at least one and not more than the number of carboxyl hydrogen atoms in the radical $R_1$.

5. A new organic mercury compound of the general formula $(C_6H_5Hg)_x.R_1$, in which $R_1$ represents a radical of a dye containing carboxyl, hydroxyl and NH groups, which radical is linked to a $C_6H_5Hg$ group by the replacement of a carboxyl hydrogen atom; and in which $x$ is an integer representing the number of $C_6H_5Hg$ groups in the compound, which integer is at least one and not more than the number of carboxyl hydrogen atoms in the radical $R_1$.

6. A new organic mercury compound of the general formula $(C_6H_5Hg)_x.R_1$, in which $R_1$ represents a radical of a dye containing carboxyl and hydroxyl groups, which radical is linked to a $C_6H_5Hg$ group by replacement of a carboxyl hydrogen atom; and in which $x$ is an integer representing the number of $C_6H_5Hg$ groups in the compound, which integer is at least one and not more than the number of carboxyl hydrogen atoms in the radical $R_1$.

7. Phenylmercury carboxylate of the dye Alizarine Yellow, said dye having the formula:

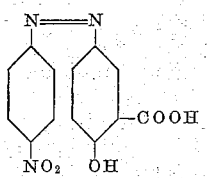

8. Phenylmercury carboxylate of the dye Rhodamine B, said dye having the formula:

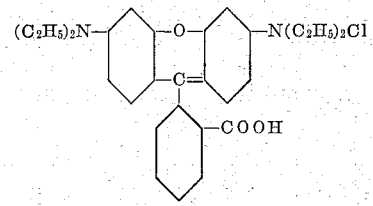

9. A phenylmercury carboxylate of the dye Fastusol Yellow GGA, said dye having the formula:

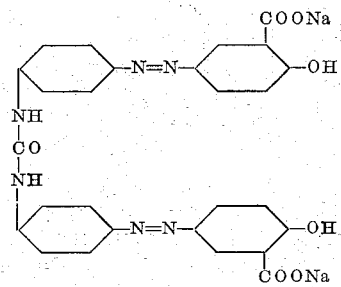

CARL N. ANDERSEN.